(12) United States Patent
Eisenmann, II et al.

(10) Patent No.: US 6,331,012 B1
(45) Date of Patent: Dec. 18, 2001

(54) BICYCLE TRAINING WHEEL ASSEMBLY

(76) Inventors: Al A. Eisenmann, II, 5250 Colodny Dr., #18, Agoura Hills, CA (US) 91301; Peter J. Yatron, 31521 Hipshot Dr., Castaic, CA (US) 91384

( * ) Notice: Subject to any disclaimer, the term of this patent is extended or adjusted under 35 U.S.C. 154(b) by 0 days.

(21) Appl. No.: 09/705,510

(22) Filed: Nov. 3, 2000

Related U.S. Application Data
(60) Provisional application No. 60/180,797, filed on Feb. 7, 2000.

(51) Int. Cl.[7] .................................................. B62J 15/00
(52) U.S. Cl. ........................................ 280/293; 280/301
(58) Field of Search .................................. 280/293, 301, 280/298, 124.102; 267/174, 175, 170, 177, 169

(56) References Cited

U.S. PATENT DOCUMENTS

| | | | |
|---|---|---|---|
| 590,568 | * 9/1897 | Erwin | 280/293 |
| 720,860 | * 2/1903 | Von Trutzschler | 280/293 |
| 1,077,210 | * 10/1913 | Alesani | 280/293 |
| 2,439,755 | 4/1948 | Schwinn . | |
| 2,450,979 | 10/1948 | Moller . | |
| 4,595,213 | 6/1986 | Tsuchie . | |
| 4,810,000 | * 3/1989 | Saunders | 280/293 |
| 5,064,213 | 11/1991 | Storch . | |
| 5,100,163 | 3/1992 | Egley et al. . | |
| 5,352,403 | 10/1994 | Egley . | |

FOREIGN PATENT DOCUMENTS

| | | | |
|---|---|---|---|
| 687358 | * 8/1930 | (FR) | 280/293 |

* cited by examiner

*Primary Examiner*—Daniel G. DePumpo
(74) *Attorney, Agent, or Firm*—Kelly Bauersfeld Lowry & Kelley, LLP

(57) ABSTRACT

A training wheel assembly includes an upper frame segment having multiple height adjustment apertures for adjustably attaching the assembly to a bicycle, a lower frame segment pivotally attached to the upper frame segment, wheel rotatably attached to the lower frame segment, and an adjustable strut assembly interconnected between the upper and lower free segments. A first end of a strut assembly is pivotally connected to the upper frame segment and a second end of the strut assembly is pivotally connected to the lower frame segment. The strut assembly includes a hollow sleeve, a spring disposed within the sleeve, and a shaft adjustable relative to one end of the strut assembly so that one end thereof is in contact with the spring to increase or decrease the compression of the spring within the sleeve.

13 Claims, 5 Drawing Sheets

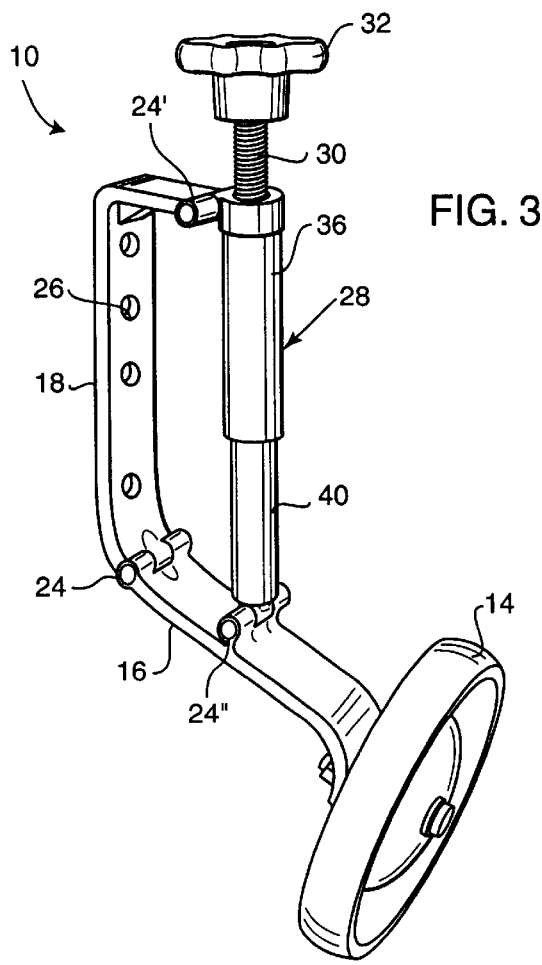
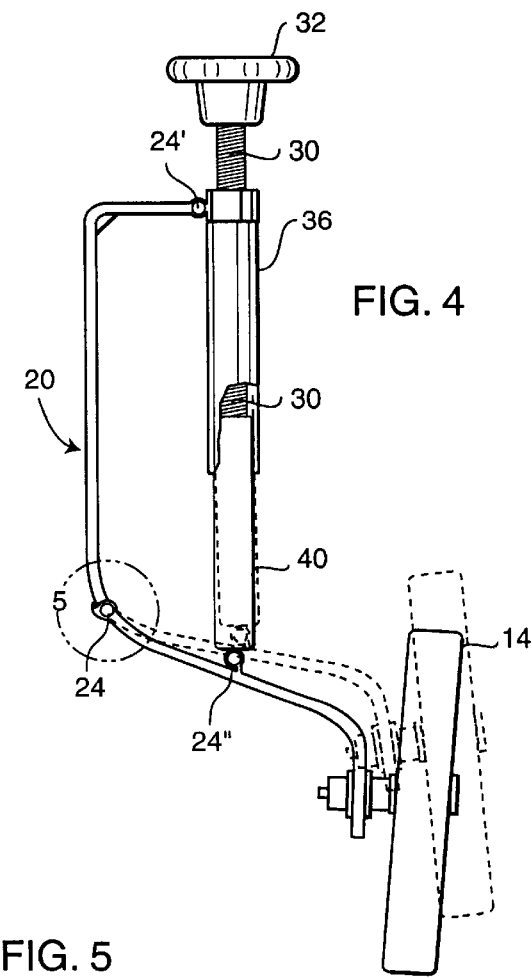
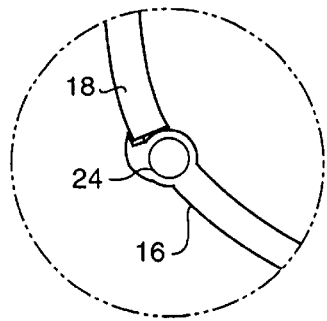

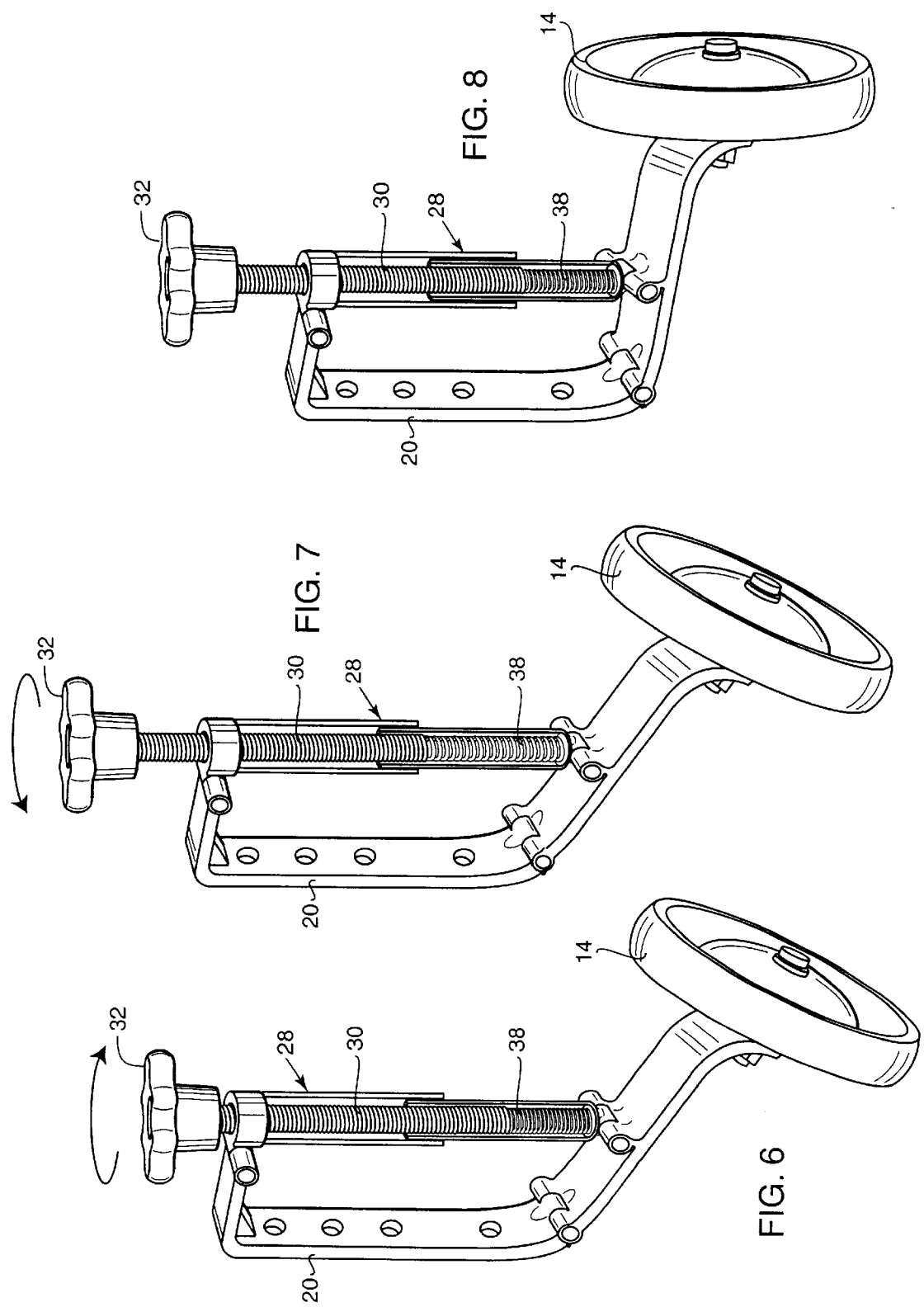

BICYCLE TRAINING WHEEL ASSEMBLY

RELATED APPLICATION

This application claims priority from provisional application Ser. No. 60/180,797, filed Feb. 7, 2000.

BACKGROUND OF THE INVENTION

The present invention relates to bicycle training wheels. More particularly, the present invention relates to a bicycle training wheel assembly which utilizes vertical spring loaded strut assemblies connected to a pivoting frame for aiding in control of the vertical placement of the bicycle to which the assembly is attached.

A bicycle is a very popular means of transportation for people around the world. Children especially use the bicycle as a primary mode of transportation. The earlier a child learns to ride, the quicker he or she begins to experience a degree of independence. Children normally begin riding a tricycle before learning to ride a bicycle. The transition between the tricycle and the bicycle is often bridged by placing training wheels on the bicycle to assist in balancing the bicycle.

The conventional fixed training wheel provides a pair of side-mounted wheels on a bicycle. The wheels are fixed in place when initially installed on the bicycle. Typically, the initial placement puts the wheels' surface on the ground, thereby providing tricycle-like stability to the two-wheel bicycle. As the bicycle rider gains skill and confidence, the wheels are adjusted upward with respect to the ground so that the training wheels no longer ride along the ground and the rider must improve his or her balance to ride the bicycle. Eventually, the rider gains ability to the point that the training wheels are removed.

Conventional training wheels typically consist of rigid brackets which are mounted onto the rear axle of the bicycle. However, such brackets have no "give" since they are normally formed of thick metal bars. During a sharp turn, when the bicycle tilts significantly into the turn, the bicycle weight is transferred from the main rear wheel to the training wheel on the side on which the bicycle tilts. When the bicycle tilts excessively and the center of gravity extends beyond the training wheel, restoring balance when coming out of a turn becomes very difficult resulting in an increased risk of falling.

Accordingly, there is a need for a bicycle training wheel assembly which helps control the vertical positioning of the bicycle to which it is attached. Such a bicycle training wheel assembly should be adjustable to meet the needs of various rider weights and abilities. What is further needed is a bicycle training wheel assembly which includes a pivoting bracket to insure a fully smooth articulated motion. The present invention fulfills these needs and provides other related advantages.

SUMMARY OF THE INVENTION

The present invention resides in an, adjustable spring loaded training wheel assembly for bicycle balance training. A spring loaded strut assembly helps control the vertical orientation of the bicycle that the assembly is mounted to. The assembly assists the rider to hold a vertical range with fluid spring assisted motion. The rider is allowed to lean into turns through an adjustable range of increasing or decreasing side travel and spring compression. The assembly is designed to fit a wide range of bicycles. The spring compression capacity is adjustable and interchangeable to meet the needs for the various abilities and weights of riders.

The training wheel assembly is generally comprised of a totally articulated three point pivoting assembly having an upper frame segment which is attachable to a bicycle, and a lower frame segment which is pivotally attached at a first end to the upper first segment. A wheel is rotatably attached to a second end of the lower frame segment. A strut assembly is interconnected between—the upper—frame segment and the lower frame segment. The strut assembly includes a hollow sleeve, a spring disposed within the sleeve, and a shaft adjustable relative to one end of the strut assembly so that an end of the shaft is in contact with the spring.

The upper frame segment includes a first hinge component and the lower frame segment includes a second hinge component which cooperatively form a pivoting hinge when associated with one another. The upper frame segment also includes multiple height adjustment apertures for adjustably attaching the assembly to a bicycle.

The sleeve of the strut assembly includes a first tubular member slidably disposed over at least a portion of a second tubular member to form a substantially enclosed cavity in which the spring is disposed. The strut assembly is pivotally connected to both the upper and lower frame segments.

The shaft is typically threadingly received within the sleeve and includes a handle attached to an end thereof for adjusting the position of the shaft relative to an end of the strut assembly to increase or decrease the compression of the spring within the sleeve.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a perspective view of the training wheel assembly of FIG. 2;

FIG. 4 is a partially fragmented rear elevational view of the training wheel assembly of FIGS. 2 and 3, illustrating movement of a training wheel and articulation of the training wheel assembly about three pivot points;

FIG. 5 is an enlarged elevational view of area "5" of FIG. 4, illustrating an articulated joint of the frame;

FIGS. 6, 7 and 8 are schematic perspective views of the training wheel assembly of FIGS. 2–5, wherein a threaded shaft is variably positioned to provide differing spring compression within a sleeve.

DETAILED DESCRIPTION OF THE PREFERRED EMBODIMENT

Figure 1:
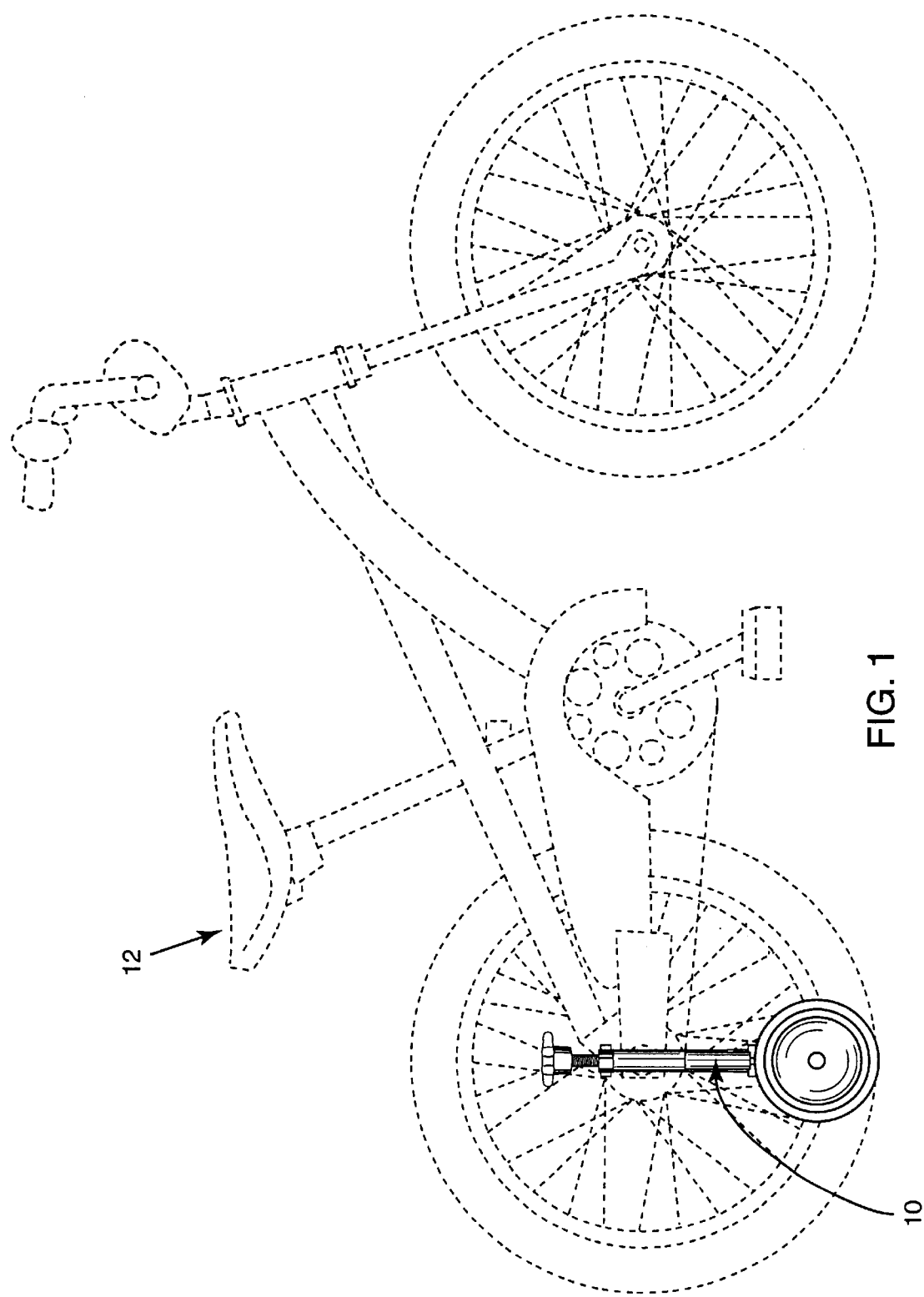
FIG. 1 is a side elevational view of a bicycle training wheel assembly embodying the present invention, shown attached to a bicycle (illustrated in phantom)

As shown in the drawings for purposes of illustration, the present invention is concerned with a bicycle training wheel assembly 10 which is attachable to a bicycle 12 and facilitates balance and vertical control techniques acquired as a rider learns to ride the bicycle 12.

Figure 2:
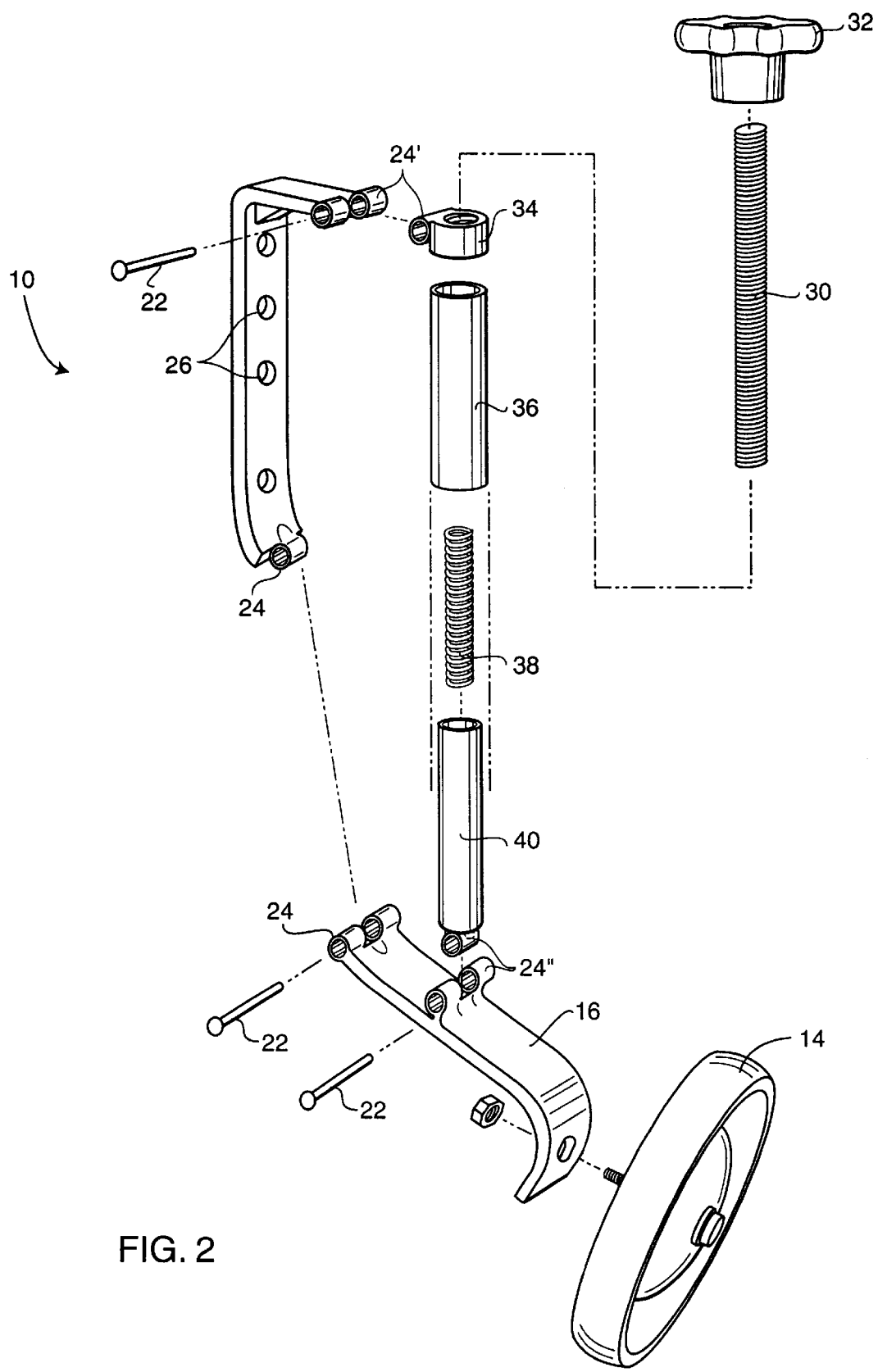
FIG. 2 is an exploded perspective view of the training wheel assembly of the present invention.

Referring to FIG. 2, the training wheel assembly 10 is comprised of a wheel 14 attached to a second end of a lower frame segment 16 which in turn is pivotally connected at a first end thereof to an upper frame segment 18. The upper and lower segments 16 and 18 cooperatively form a pivoting frame 20. The frame 20 is preferably constructed of a durable material such as metal. A pin or rivet 22 is inserted through a hinge 24 to securely interconnect the upper and lower segments 16 and 18 of the frame 20. The upper segment 18 includes several apertures 26 spaced along the length of the upper segment 18 to adjustably connect the assembly 10 to the bicycle 12 at a desired height. For example, the wheel 14 is preferably in contact with the ground when the rider is first learning to ride the bicycle 12, but the assembly 10 is moved upwardly with respect to the ground as the rider's ability progresses so that dependence on the assembly 10 is lessened.

A spring loaded strut assembly 28 is interconnected between the upper and lower segments 16 and 18 in approximately a vertical position with respect to the ground. Pins 22 extend through hinges 24' and 24" so that the strut assembly 28 has a degree of radial motion as it pivotally articulates about the hinges 24' and 24" relative to the frame 20.

The strut assembly 28 is comprised of a threaded shaft 30 having a handle 32 attached at one end thereof, the shaft 30 being threadedly inserted through an internally threaded neck 34, which is pivotally attached to the upper segment 18 of the frame 20 at hinge 24'. The shaft 30 extends downwardly through the neck 34 and a generally cylindrical first tubular member 36 and contacts a spring 38. A second tubular member 40 is pivotally connected to the lower frame segment 16. The second tubular member 40 slidingly fits within the lower end of the first tubular member 36 to cooperatively form a sleeve and a cavity in which the spring 38 is disposed.

With reference to FIGS. 3–5, the spring 38 is fully housed within the first and second tubular sleeve members 36 and 40 in order to protect the spring 38 from dirt and debris and the like, and more importantly to prevent a child's fingers from being caught and injured in the spring 38. The hinge 24 between the upper and lower segments 16 and 18 of the frame 20, as well as the pivotal connection points 24' and 24" between the frame 20 and the strut assembly 28 cooperate with the sliding compression and extension movement of the strut assembly 28 to smoothly articulate the assembly 10 when downward force is applied to the assembly 10, such as when the rider tilts the bicycle 12 in a turn. As the spring 38 is compressed during the turn, the stored energy within the spring 38 causes it to recoil and extend to aid the child in vertically righting the bicycle 12 after the turn. The articulation of the assembly 10 also maintains an optimal angle of wheel 14 contact with the ground to prevent slipping or grabbing of the wheel 14 during the turn.

Referring now to FIGS. 6–8, the handle 32 can be turned to move the shaft 30 downwardly to compress the spring 38 or upwardly to decompress the spring 38. The effect of this is that when the spring 38 is compressed there is little space for the spring 38 to travel and the degree of tilt in a turn and the corresponding upright push from the recoil of the spring 38 is reduced. On the other hand, when the shaft 30 is unscrewed upwardly and the spring 38 has more space within the strut assembly 28 to travel, a greater degree of tilt during a turn is provided. Thus, a more advanced rider can tilt the bicycle 12 on sharper turns while receiving the benefit of the assistance of straightening the bicycle 12 after the turn. The spring 38 itself is interchangeable so that different spring capacities can be matched to different riders' weight and abilities. For example, an adult learning to ride a bicycle 12 would need a more durable spring 38 than a young child. Such springs 38 could be color coded and a reference chart provided so that the user could determine which spring 38 is best suited the rider of the bicycle 12.

Figure 11:
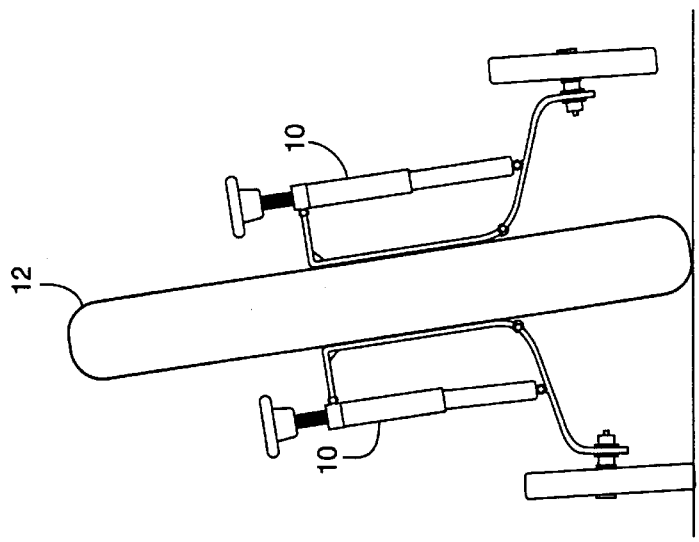
FIGS. 9, 10 and 11 are schematic representations of a pair of training wheel assemblies positioned on a bicycle, illustrating the compression of the spring unit and the articulation of the frame as force is applied to the respective training wheel assemblies.
Figure 10:
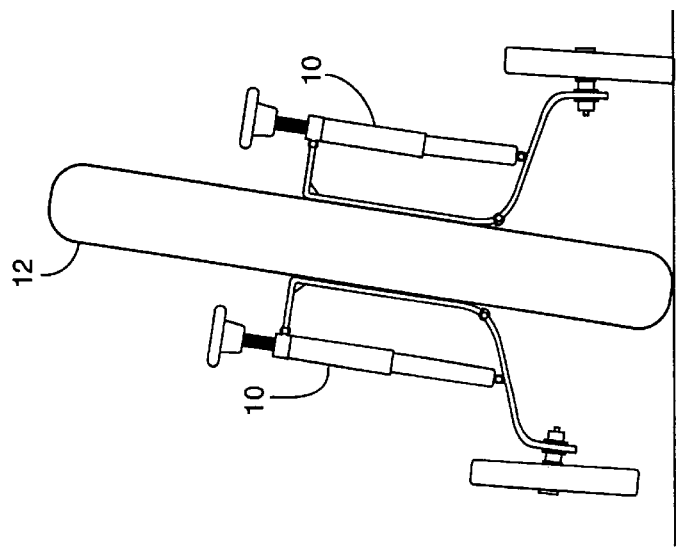
Figure 9:
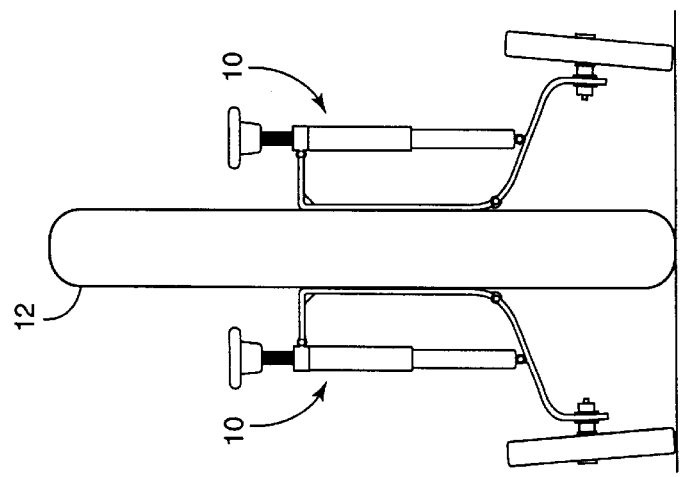

As illustrated in FIGS. 9–11, when the bicycle 12 is vertical and on flat ground, the assemblies 10 act as traditional training wheels. However, when the ground becomes uneven or the rider leans to turn, the strut assembly 28 on the side of the turn is compressed and the spring 38 naturally and recoils against the applied force to the bicycle from falling over and right the rider in a vertical position when the turn is completed.

Although an embodiment has been described in detail for purposes of illustration, various modifications may be made without departing from the scope and spirit of the invention. Accordingly, the invention is not to be limited, except as by the appended claims.

What is claimed is:

1. A bicycle training wheel assembly, comprising:

an upper frame segment attachable to a bicycle;

a lower frame segment pivotally attached to the upper frame segment at a first end thereof;

a wheel attached to a second end of the lower frame segment; and a strut assembly having first and second ends connected to, respectively, the upper and lower frame segments, the strut assembly including a hollow sleeve, a spring disposed therein, and a shaft adjustable relative to one end of the strut assembly and having an end in contact with the spring;

wherein the sleeve includes a first tubular member slidably disposed over at least a portion of a second tubular member to form a substantially enclosed cavity.

2. The assembly of claim 1, wherein the shaft is threadingly received within the sleeve.

3. The assembly of claim 2, including a handle attached to the shaft.

4. The assembly of claim 1, wherein the upper frame segment includes a first hinge component and the lower frame segment includes a second hinge component, the first hinge component and second hinge component cooperatively forming a pivoting frame hinge when associated with one another.

5. The assembly of claim 1, wherein the upper frame segment includes multiple height adjustment apertures.

6. The assembly of claim 1, wherein the strut assembly is pivotally connected to the upper and lower segments of the frame.

7. The assembly of claim 1, wherein the first tubular member cooperates with the upper frame segment to form a pivotable first hinge, and the second tubular member cooperates with the lower frame segment to form a pivotable second hinge.

8. A bicycle training wheel assembly, comprising:

an upper frame segment attachable to a bicycle;

a lower frame segment pivotally attached to the upper frame segment at a first end thereof;

a wheel attached to a second end of the lower frame segment; and a strut assembly having first and second ends pivotally connected to, respectively, the upper and lower frame segments, the strut assembly including a hollow sleeve having a first tubular member slidably disposed over at least a portion of a second tubular member to form a substantially enclosed cavity, a spring disposed within the cavity, and a shaft threadingly received within the sleeve and adjustable relative to one end of the strut assembly and having an end thereof in contact with the spring.

9. The assembly of claim 8, wherein the upper frame segment includes a first hinge component and the lower frame segment includes a second hinge component, the first hinge component and second hinge component cooperatively forming a pivoting frame hinge when associated with one another.

10. The assembly of claim 8, wherein the upper frame segment includes multiple height adjustment apertures.

11. The assembly of claim 8, wherein the first tubular member cooperates with the upper frame segment to form a pivotable first hinge, and the second tubular member cooperates with the lower frame segment to form a pivotable second hinge.

12. The assembly of claim 8, including a handle attached to the shaft.

13. A bicycle training wheel assembly, comprising:

an upper frame segment having multiple height adjustment apertures for adjustable attachment to a bicycle;

a lower frame segment adjacent to the upper frame segment;

a pivoting hinge disposed between and connecting the upper frame segment and the second frame segment;

a wheel rotatably attached to a second end of the lower frame segment; and a strut assembly having first and second ends pivotally connected to, respectively, the upper and lower frame segments, the strut assembly including a hollow sleeve having a first tubular member slidably disposed over at least a portion of a second tubular member to form a substantially enclosed cavity, a spring disposed within the cavity, and a shaft threadingly received within the sleeve and adjustable relative to one end of the strut assembly and having an end thereof in contact with the spring;

wherein the first tubular member cooperates with the upper frame segment to form a pivotable first hinge, and the second tubular member cooperates with the lower frame segment to form a pivotable second hinge.

* * * * *